(12) United States Patent
Zhu (10) Patent No.: US 6,681,053 B1
(45) Date of Patent: Jan. 20, 2004

(54) METHOD AND APPARATUS FOR IMPROVING THE DEFINITION OF BLACK AND WHITE TEXT AND GRAPHICS ON A COLOR MATRIX DIGITAL DISPLAY DEVICE

(75) Inventor: Daniel Q. Zhu, Columbus, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/368,631

(22) Filed: Aug. 5, 1999

(51) Int. Cl.[7] ............................................... G09G 3/20
(52) U.S. Cl. ................................... 382/258; 358/3.07
(58) Field of Search ............................. 382/258–259, 382/308; 358/1.9, 3.07, 3.21, 3.06

(56) References Cited

U.S. PATENT DOCUMENTS

| 4,136,359 A | 1/1979 | Wozniak | 358/17 |
| 2003/0006978 A1 * | 1/2003 | Fujiyoshi | 345/204 |

FOREIGN PATENT DOCUMENTS

| JP | 2001117529 A * | 4/2001 | G09G/3/20 |

OTHER PUBLICATIONS

C. Tamahori, Demonstration: Optimising LCD Display of Text, 11/98, Http://oxy.sfx.co.nz/lcdtype.
Microsoft Research Announces Screen Display Breakthrough at COMDEX/fall '98, Http://www.microsoft.com/prespass/press/1998/nov98/cleartypepr.htm.
Sub–Pixel Font Redering Technology, Implementation Details, Http://grc.com/cttech.htm.
Sub–Pixel Font Redering Technology, How it Works, Http://grc.com/ctwhat.htm.
B. Howard and C. Levin, Splitting Pixels, Dec. 8, 1998, Http://www.zdnet.com/pcmag/news/trends/t981208a.html.
J. Tupper, Hypetype, Nov. 17, 1998, Http://www.peda.com/info/hypetype.html.
Sub–Pixel Font Redering Technology, Who Did it First?, Http://grc.com/ctwho.htm.

* cited by examiner

*Primary Examiner*—Thomas D. Lee
*Assistant Examiner*—Stephen Brinich
(74) *Attorney, Agent, or Firm*—RatnerPrestia (57) ABSTRACT

A digital signal processing (DSP) method to process rendered text in order to achieve up to 300% of the horizontal resolution on any suitable digital display devices such as LCD, PDP and DLP. When the text is rendered, a single picture element (a "pixel") of a matrix display screen is actually composed of three "sub-pixels": one red, one green, and one blue (RGB or BGR). Taken together this sub-pixel triplet makes up what has been traditionally thought of as a single pixel. By staggering and processing the sub-pixel elements horizontally, font resolution is effectively increased to the maximum of 300%. There are three processing steps involved. First, the color image is expanded to a gray scale image having triple the number of horizontal pixels as the original image by interleaving the sub-pixels. Next, a black and white text/graphics (TG) detector is deployed to identify the TG of interest in the gray scale image. Then, the, the detected TG and only the detected TG is subject to a morphological thinning operation so that the TG approximates fonts (or graphics) that would be generated from a sub-pixel rendering engine. Finally, the processed TG display data is filtered to minimize color fringing while maximizing its resolution. The resulting display data including the processed TG data and the unprocessed color signals are converted back to the sub-pixels (e.g., RGB or BGR) domain and displayed.

15 Claims, 5 Drawing Sheets

FIG. 1a

```
RGB
RGB
RGB
   RGB
   RGB
   RGB
      RGB
      RGB
      RGB
         RGB
         RGB
            RGB
            RGB
            RGB
```

```
       RGB
      GBR
      BRG
       RGB
        GBR
         BRG
          RGB
           GBR
            BRG
             RGB
              GBR
               BRG
                RGB
                 GB
                  B
```

METHOD AND APPARATUS FOR IMPROVING THE DEFINITION OF BLACK AND WHITE TEXT AND GRAPHICS ON A COLOR MATRIX DIGITAL DISPLAY DEVICE

FIELD OF THE INVENTION

The present invention relates to the field of sub-pixel rendering techniques used on a matrix digital display. More specifically, the present invention relates to a method for improving the definition of black and white text and graphics on a color matrix digital display device.

BACKGROUND OF THE INVENTION

Today, the state-of-the-art methods for improving the definition of black and white text graphics, including Microsoft ClearType technology, increase the potential display resolution of black and white text on a color matrix digital display device by using conventional sub-pixel rendering techniques. The improvement of the on-screen reading experience resulting from the sub-pixel rendering methods has enabled new product categories such as electronic books (eBooks). This improvement has also benefited the display of existing spreadsheets, word processing documents and Internet content which display text using fonts that have been rendered for color matrix displays. Font sub-pixel rendering is a well known technique, but it can not correct all problems with an image displayed on a color matrix digital display device. For example, sub-pixel rendering cannot apply to any text in which fonts have already been rendered, as in the case of a bitmapped image which contains text.

There are several types of sub-pixel rendering techniques in use today. One type is a sub-pixel horizontal resolution rendering used on digital matrix display devices. Another type is the horizontal definition improvement rendering used for digital text type. Another type of sub-pixel rendering is used for font design. These types are described in detail below.

A single pixel of a typical digital color matrix display device such as a liquid crystal device (LCD) display or a plasma display panel (PDP) display is composed of three in-line "sub-pixels": one red, one green, and one blue (R-G-B). The sub-pixel triad forms a single pixel. The linear array of interleaved single-color sub-pixels translates to a horizontal resolution of three times the maximum horizontal resolution that could be achieved for the display. Therefore, addressing the actual sub-pixels individually and ignoring their differing colors could provide as much as three times the horizontal resolution from the existing digital matrix display panels than if single pixel addressing were used. Sub-pixel rendering works because human eyes perceive changes in luminance with greater resolution than changes in color.

Furthermore, when a white line is presented on a color matrix display, what really is being displayed is a line of sub-pixel triads of red, green and blue. The human eye does not perceive these closely spaced colors individually because the vision system does not see color changes at high resolution. Accordingly, the human eye mixes the three primary colors in combination to form intermediates. The eyes only register any of the three primary colors when single sub-pixels of the primary color signals are exclusively illuminated in an multi-pixel area. All other combinations of the primary color signals are perceived as intermediate (secondary and tertiary) color signals. The combination of all three color signals in the proper intensity is perceived as white and the absence of all color signals is perceived as black.

Figure 1A:
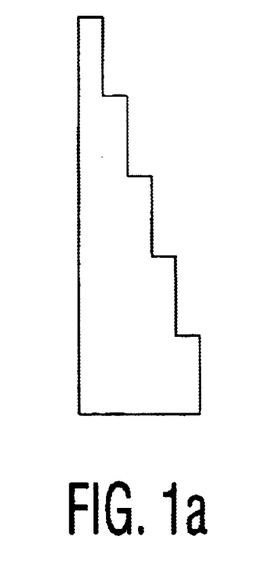
FIGS. 1a, and 1b (Prior Art) are Pixel diagrams which show examples of objects rendered based on whole pixels horizontally.
Figure 1B:
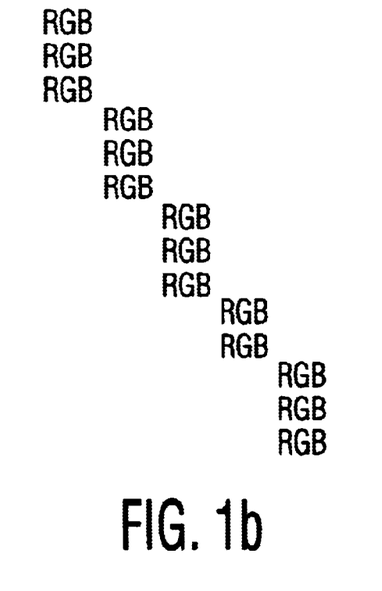
Figure 2A:
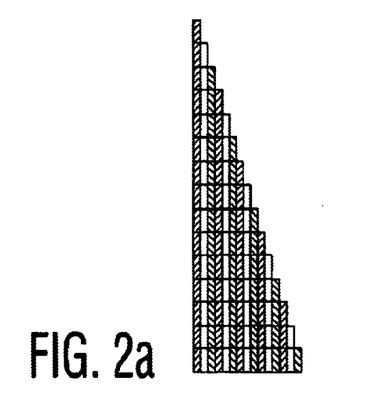
FIGS. 2a, and 2b (Prior Art) are Pixel diagrams which show examples of objects rendered based on sub-pixels horizontally.
Figure 2B:
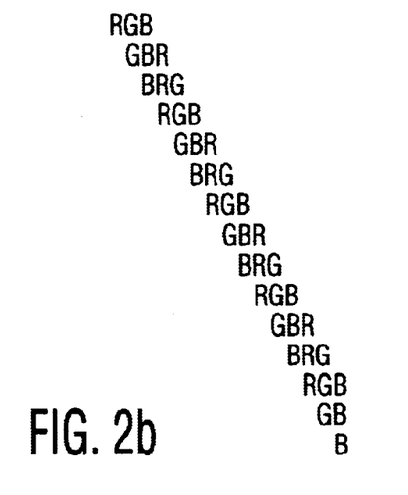

A Web Page on the Internet entitled "Sub-Pixel Rendering Technology, How it Works" at http://gre.com/ctwhat.htm, provides details and examples of sub-pixel rendering technology. One example from the Web Page is shown in FIG. 1a. This example shows that an object having a diagonal edge, 5 pixels wide, which is drawn based on a whole (RGB) white pixels creates a jagged edge. Similarly, FIG. 1b illustrates an example of a 5×15 pixel grid displaying a diagonal line travelling down 5 pixels. When the same objects are drawn based on sub-pixels, the diagonal edge becomes smooth, as shown in FIGS. 2a and 2b, respectively.

Figure 3:
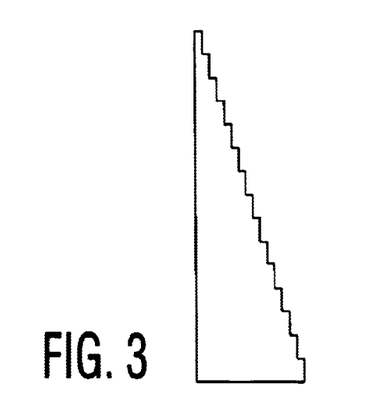
FIG. 3 (Prior Art) is a Pixel diagram which illustrates how the object shown in FIG. 2b may be perceived against a black background.

FIG. 3 illustrates that although the pixels along the edge are no longer white, they will be perceived as white by the eye because the sub-pixel color-bars are immediately adjacent to the other primary colors and the background is black. Therefore, by controlling the three sub-pixels of a color matrix display individually, greater horizontal resolution for (black and white) text or graphics can be achieved.

Figure 4A:
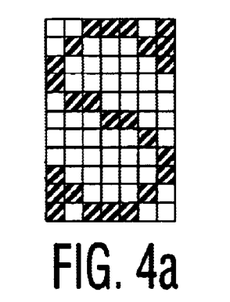
FIGS. 4a, 4b, 4c and 4d (Prior Art) are Pixel diagrams which are useful for describing sub-pixel font rendering on a color matrix display.
Figure 4B:
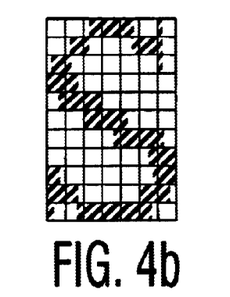
Figure 4C:
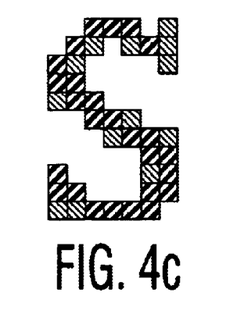
Figure 4D:
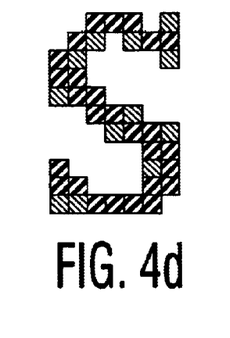

The conventional method for controlling the sub-pixels is through rendering. Rendering maps the pixels of the letters in a font onto the three sub-pixels in a particular sequence in order to achieve optimum resolution for the font. For example, FIG. 4a shows a 12 point regular (non-italics, non-bold) capital "S" rendered, using full-pixel rendering techniques, in Microsoft's standard Times New Roman font. FIG. 4b illustrates what the capital "S" looks like at the sub-pixel level when the pixels shown in FIG. 4a are shifted one-third of a pixel to the right. The result is a blocky letter which may be difficult for the human eye to resolve. A technique known as 'anti-aliasing' was developed to make blocky letters easier to resolve. Using this technique, the image in FIG. 4c replaced the partially filled pixels each representing a proscribed gray level. A one-third filled pixel is assigned a light gray and a two-thirds filled pixel is assigned a dark gray. The eye will tend to average gray pixels with the adjacent pixels. FIG. 4d shows the anti-aliased letter rendered for a color matrix display, with the red-green-blue sequencing of the sub pixels elements. In this image, the coloration of the sub-pixels of the letter corresponds to the horizontal position of the visual energy.

Also described in the above-referenced Web Page are other areas that are suitable for sub-pixel rendering such as font character kerning. The process of font character kerning deals with managing the spacing between characters. Readability is enhanced by smoothing out the density of the resulting type. Kerning can be problematic at small point sizes due to the relatively large pixel size. When two characters are moved together by one pixel, they are too close. However, with sub-pixel rendering, character spacing can be tuned using a granularity of one-third of a pixel width for improved text readability.

Font embedding is another area suitable for sub-pixel rendering. Here the problem is bold face type. Sometimes "bold" text may seem too bold and at other times, it may not seem different from normal text. This is caused by the large relative horizontal width of display pixels. Typically, a letter is made "bold" by adding one or more horizontal pixels to the letter. Adding a pixel-width to a relatively small feature of a character may cause that feature to appear too bold while adding a pixel width to an already large feature may not appear to change the character at all. Sub-pixel rendering may be used to address at least part of this problem as the width of a character may be adjusted in units of one-third of a pixel.

Font Italicizing is another area suitable for sub-pixel rendering. Printed italic fonts can be problematic. Digital systems have encountered problems when attempting to render italics because the lines which form the letters all become slanted and, as described above, diagonal features do not translate well into large pixels. Here again, sub-pixel rendering allows the displaying of sloping features by fine-tuning the location and width of each pixel.

In general, it is a font designer who renders any given type (B&W) font with three times the horizontal resolution for LCD display applications. Therefore, a triple-width text image containing three times the rendering information (a three-times wider letter) is created, or the font is rendered at triple the horizontal width into a standard black and white region. However, the rendered text without additional processing would exhibit some undesirable artifact, known as color fringing. Color fringing occurs when adjacent rendered sub-pixels have the same color. For example, if the letter "I" is rendered in white-on-black text such that the first sub pixel in the stem is red and the last sub-pixel in the stem is green, then reading across the stem, the sub-pixel sequence may be RGBRG along the entire stem of the "I." The vertically adjacent "RG" pixels at the right side of the stem may be seen as a yellow fringe on the side of the letter.

Sub-pixel rendering may result in color fringing because when any one or two of the color sub-pixels that make up a whole pixel unit are not simultaneously turned on or off, some color surrounding each character can be seen. For example, red is seen if a single red sub-pixel is on while magenta is seen if both red and blue sub-pixels are on. The remedy is to diffuse the extra color intensity through its immediate neighboring sub-pixels horizontally to vary the color of adjacent pixels in the rendered font. This, however, results in a blurring the letter similar to the anti-aliasing filtering of the letters as shown in FIGS. 4c and 4d. From the signal processing point of view, a lowpass FIR filter can be used to filter the text image horizontally in order to provide anti-aliasing filtering and to mitigate color fringing. The tradeoff between color-fringing artifact and image blurring can be made within the filter design such as bandwidth of the filter. This trade-off, however, usually produces an unsatisfactory result for small fonts. Either the character is too blurred or it exhibits noticeable color fringing.

Thus current sub-pixel rendering techniques have a major limitation. They cannot effectively be applied to a rendered font/text or graphics. In addition, these techniques require considerable effort by font designers and can not be applied to images that contain text such as bit-mapped images or compressed images (e.g. Tagged Image File Format (TIFF), Graphica Interchange Format (GIF) of Joint Pictures Experts Group (JPEG) images). Therefore, it is desirable to use additional digital signal processing techniques to expand the sub-pixel rendering methods beyond font/text creation. Specifically, there is a need for a post-process rendered B&W text or graphics image in typical bitmap form to achieve higher (horizontal) image resolution in a color matrix display.

SUMMARY OF THE INVENTION

The present invention is embodied in a digital signal processing (DSP) technique which finds and processes rendered text which is to be displayed on a color matrix display to increase its horizontal resolution. First, a black and white text/graphics (TG) detector is deployed to identify areas of the image which include TG. Next, the detected TG is processed with a morphological operation so that it approximates the fonts (or graphics) that would be generated from a sub-pixel rendering engine. Finally, the processed TG display data is filtered so as to minimize color fringing while maximizing its resolution. The resulting TG display data is then converted back to the sub-pixel (i.e., RGB) domain replacing the detected TG data in the image and the resulting composite image is displayed.

BRIEF DESCRIPTION OF THE DRAWINGS

The invention is best understood from the following detailed description when read in connection with the accompanying drawings. Included in the drawings are the following figures:

FIGS. 6, 6A and 6B are matrix diagrams which are useful for describing the morphological thinning process shown in FIG. 5.

DETAILED DESCRIPTION OF THE EXEMPLARY EMBODIMENT

In the methods described above, the font designer rendered the letters in sub-pixel granularity to produce readable letters on color matrix displays. The subject invention automatically approximates the rendering process on black and white text and graphics components of color images which are to be displayed on a color matrix display device. In one exemplary embodiment of the invention, images to be displayed on the color matrix display device are stored in a frame memory which may be accessed by the digital signal processor (not shown) which implements the inventive process.

Figure 5:
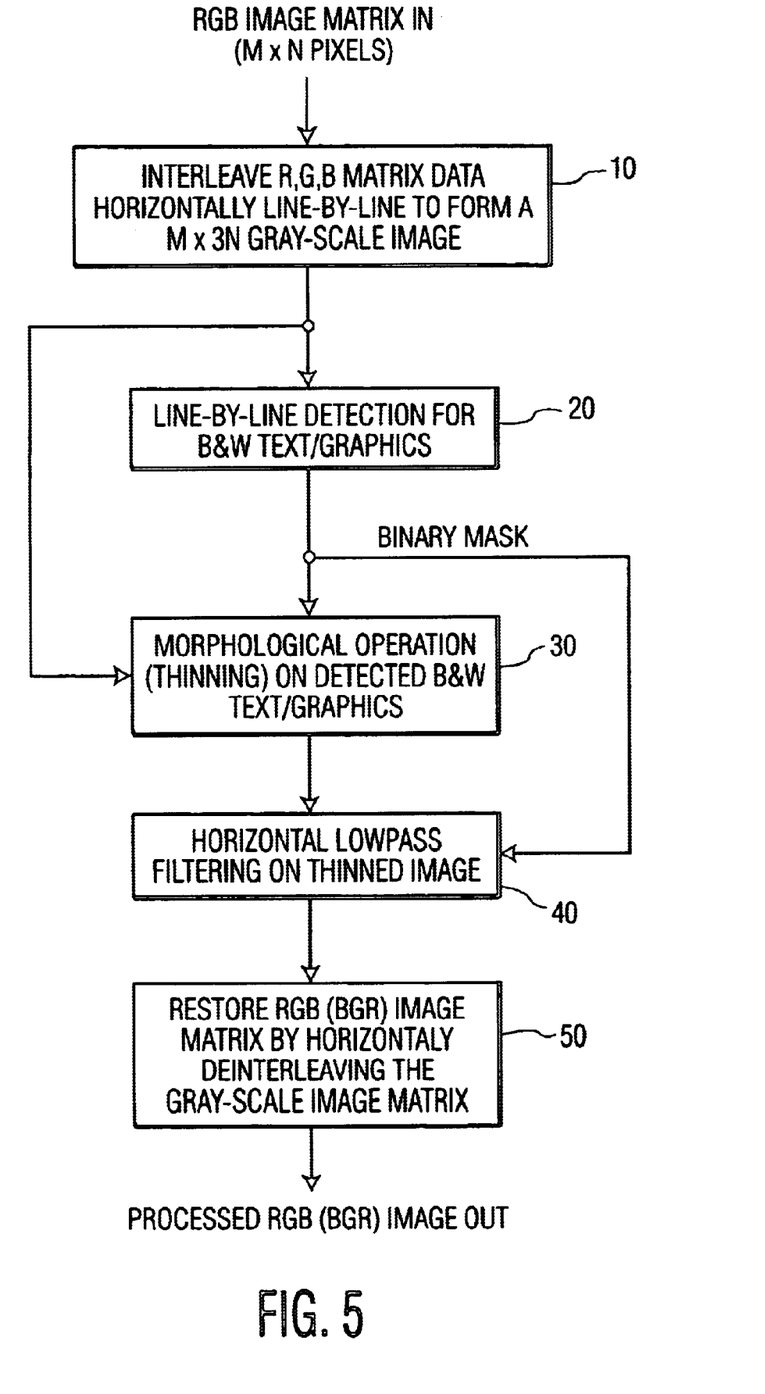
FIG. 5 is a flowchart diagram of a process according to the present invention.

FIG. 5 provides an overview of the sub-pixel processing method for rendered black and white text and graphics which exists in a color image. The method first processes the entire image to expand it by a factor of three by translating each sub-pixel into a full pixel by interleaving the Red Green and Blue (RGB) sub-pixel data horizontally to form a gray-scale text/graphics (TG) image with three-times of the original image width. Thus, the M×N original image becomes an M×3N gray-scale image.

Without loss of generality, any rendered TG image can be expressed as individual R, G, and B intensity matrices. The intensities of corresponding pixels from each matrix combine to create theactual pixel color at a given location. The $i^{th}$ column of the horizontally interleaved RGB matrix Y will take the form of:

$$Y_i = \begin{cases} R_{3k+1}, i = 3k+1 \\ G_{3k+1}, i = 3k+2, k = \left[\frac{i-1}{3}\right] \\ B_{3k+1}, i = 3k+3 \end{cases} \quad (1)$$

for display panel with R G B subpixel orentation $$Y_i = \begin{cases} B_{3k+1}, i = 3k+1 \\ G_{3k+1}, i = 3k+2, k = \left[\frac{i-1}{3}\right] \\ R_{3k+1}, i = 3k+3 \end{cases} \quad (2)$$

for display panel with B G R subpixel orentation where [x] is the integer part of x.

Next, in Step 20 a binary mask matrix M is created to indicate B&W pixels in the image. The threshold for B&W pixel can be adjusted. One method for detection of black and white pixels is "Advanced Thresholding". This method uses a window area around each pixel to estimate the background gray level for the pixel. The difference between the actual pixel value and the background is then compared to the dynamic setting to determine if a pixel is thresholded as a black or a white pixel. Pixels which are between the black threshold and the white threshold represent gray-scale portions of the image and are referred to herein as "gray" pixels. The mask matrix may, for example, have a 1 for every black or white pixel and a 0 for every gray pixel. The black and white portions of the image are separated from the gray-scale portions by processing the logical AND of the mask matrix and the horizontally expanded image and replacing the pixels in the expanded image based on the result of the thinning operation.

In order to reduce aliasing in the luminance (Y) signal as a result of horizontal sub-pixel repetitions (interleaving), in Step 30 a morphological thinning process is used to make letters in the text more smooth and edges in the graphics less jagged. The morphological thinning process is similar to anti-aliasing, but instead of adding grayscale pixels to smooth a sharp edge, the morphological thinning process selectively turns individual sub-pixels on or off. For example, to enhance diagonals and curves with different angles, the process increases the apparent resolution so that the resulting thinned image its more tolerant to low pass filtering. Because all gray pixels in the horizontally expanded image have a value of 0 in the mask matrix, they will not be affected by the morphological thinning operation.

One implementation of the morphological thinning process is to use a nxn fate table in which $2^n$ neighboring sub-pixels have a value of 1 or 0, depending on whether the pixel is ON or OFF (i.e. white or black). A particular configuration of the $2^n$ neighboring sub-pixels can be translated into a value by, for example, reading the individual 1 or 0 valued sub-pixels as bits of a binary word. Coding these $2^n$ binary values produces a single integer number between 0 and $2^n-1$. This value may then be used to address a look-up table with $2^n$ entries. Each entry in the table is a 0 or a 1 indicating a preferred value for the center sub-pixel in the array of 2n neighboring sub-pixels. In the exemplary embodiment of the invention, n=3 is used because of its relative computational simplicity. It is contemplated, however, that larger or smaller values of n may be used effectively. The inventor has determined that the following morphological operation is effective in rendering arbitrary black and white graphics:

Let a 3×3 data block be the following binary matrix.

$$A = \begin{bmatrix} a_8 & a_5 & a_2 \\ a_7 & a_4 & a_1 \\ a_6 & a_3 & a_0 \end{bmatrix}$$

Where $a_i \in \{0,1\} \forall i=0,1,\ldots,8$

The transformation to obtain an index value, $I_A$ for a particular configuration of bits in the matrix is defined as $$I_A = \sum_{i=0}^{8} a_i 2^i$$

The morphological operation on A $$B=f(A)$$

can also be expressed as a table lookup operation $$b=T(I_A);$$

where $b \in \{0,1\}$ and will replace the center sub-pixel $a_4$ of A. The value that is replaced in the image is a digital value which represents either black or white. In the exemplary embodiment of the invention, a black pixel has the minimum level of the R, G and/or B sub-pixels while for a white pixel, the levels of the R, G and/or B sub-pixels are set to their maximum values. It is contemplated, however, that alternate methods may be used, depending on the thresholding system that is used to generate the binary mask at step 20. One method may be to assign the threshold values used to differentiate the black and white pixels from the color pixels as the values for the black and white sub-pixels. Another method may be to assign the black and white pixel values as the respective average values of the pixels which were detected as being black and the pixels which were detected as being white.

Figure 6A:
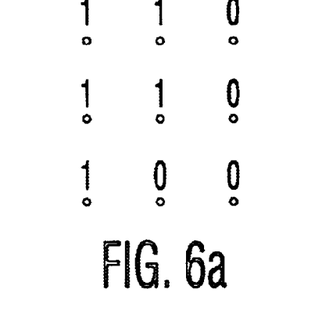
Figure 6B:
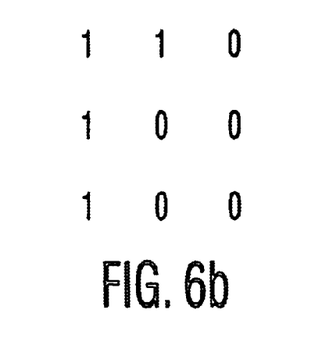

FIG. 6A shows and example of the matrix A, where $a_8=1$, $a_7=1$, $a_6=1$, $a_5=1$, $a_4=1$, $a_3=0$, $a_2=0$, $a_1=0$ and $a_0=0$. The exemplary morphological thinning process replaces $a_4$ with a zero-valued pixel, such that T(000011111)=0 (i.e. a white pixel in the image is replaced by a black pixel). The result of the thinning operation is shown in FIG. 6B.

Since $I_A$ can take 1 out of 512 values, the lookup table T would have 512 entries. Table 1 shows a lookup table which is suitable for use in the phological thinning operation of the present invention.

TABLE 1

T={
0 0 0 0 0 0 0 0 0 0 0 0 0 0 0 0 1 1 1 1 1 0 1 1
1 1 1 0 0 0 1 1 0 0 0 0 0 0 0 0 0 0 0 0 0 0 0 0
1 0 1 1 1 0 1 1 0 0 1 1 0 0 1 1 0 0 0 0 0 0 0 0
0 0 0 0 0 0 0 1 0 1 0 0 0 1 1 1 0 1 0 0 0 1 1
0 0 0 0 0 0 0 0 0 0 0 0 0 0 0 0 0 1 1 0 0 1 1
0 0 1 1 0 0 1 1 0 0 0 0 0 0 0 0 0 0 0 0 0 0 0 0
1 1 1 1 1 1 1 1 1 1 1 1 1 1 1 1 1 0 0 0 0 0 0 0
0 0 0 0 0 0 0 1 1 1 1 1 1 1 1 1 1 1 1 1 1 1 1
0 0 0 0 0 0 0 0 0 0 0 0 0 0 0 0 1 1 1 1 1 1 1 1
1 1 1 1 1 1 1 1 0 0 0 0 0 0 0 0 0 0 0 0 0 0 0 0
1 1 1 1 1 1 1 1 1 1 1 1 1 1 1 1 1 0 0 0 0 0 0 0
0 0 0 0 0 0 0 0 1 0 1 0 0 0 1 1 0 0 1 0 0 1 0 1 1
0 0 0 0 0 0 0 0 0 0 0 0 0 0 0 0 1 0 1 1 0 0 1 1
0 0 1 1 0 0 1 1 0 0 0 0 0 0 0 0 0 0 0 0 0 0 0 0
0 0 1 0 0 1 1 1 0 0 1 0 0 1 1 1 0 0 0 0 0 0 0 0
0 0 0 0 0 0 0 0 0 1 1 0 1 1 1 0 0 1 1 0 1 1 1
0 0 0 0 0 0 0 0 0 0 0 0 0 0 0 0 1 0 1 0 0 0 1 1

TABLE 1-continued

```
1 1 1 1 1 1 1 1 0 0 0 0 0 0 0 0 0 0 0 0 0 0 0 0
0 0 1 1 0 0 1 1 1 1 1 1 1 1 1 1 0 0 0 0 0 0 0 0
0 0 0 0 0 0 0 0 1 1 1 1 1 1 1 1 1 1 1 1 1 1 1 1
0 0 0 0 0 0 0 0 0 0 0 0 0 0 0 0 1 1 1 1 1 1 1 1
1 1 1 1 1 1 1 1
}
```

In the exemplary embodiment of the invention, the thinning operation is based on the assumption that the black text/graphics is on a white background. If the text/graphics and the background colors are reversed, the image is reversed before thinning and then reversed again after the thinning operation has been performed.

In Step 40 any suitable lowpass filter can be used to horizontally filter the resulting thinned image so as to minimize the color fringing artifact. Note that the filter operates on the masked image so that only the detected B&W pixels are filtered. One FIR filter that provides good compromise between color fringing reduction and text/graphics resolution has a bandwidth of about 0.3 (with 1 being the normalized sampling frequency) with 24 taps and a frequency response characteristic which approximates a Kaiser window based sinc function. The explicit tap coefficients are shown in Table 2 below.

TABLE 2

| $H_{LPF} =$ | [−0.0022 | −0.0013 | 0.0022 | 0.0084 | 0.0099 | −0.0034 | −0.0295 | −0.0438 | −0.0115 |
| 0.0809 | 0.2020 | 0.2884 | 0.2884 | 0.2020 | 0.0809 | −0.0115 | −0.0438 | −0.0295 | −0.0034 |
| 0.0099 | 0.0084 | 0.0022 | −0.0013 | −0.0022] | | | | | |

Co-pending U.S. patent application Ser. No. 09/281,554 entitled "System and Method for Scaling Combined Video and Computer Generated Imagery" filed on Mar. 30, 1999, also discloses other lowpass filters for a Kaiser-windowed sinc function interpolator that can be used to filter the text horizontally.

Returning to FIG. 5, in step 50, gray-scale image matrix is horizontally de-interleaved into three separate R, G, and B color matrixes and displayed. The black and white text and graphic portions of the image have been automatically processed by the morphological operator in a manner which approximates sub-pixel font rendering.

Figure 7:
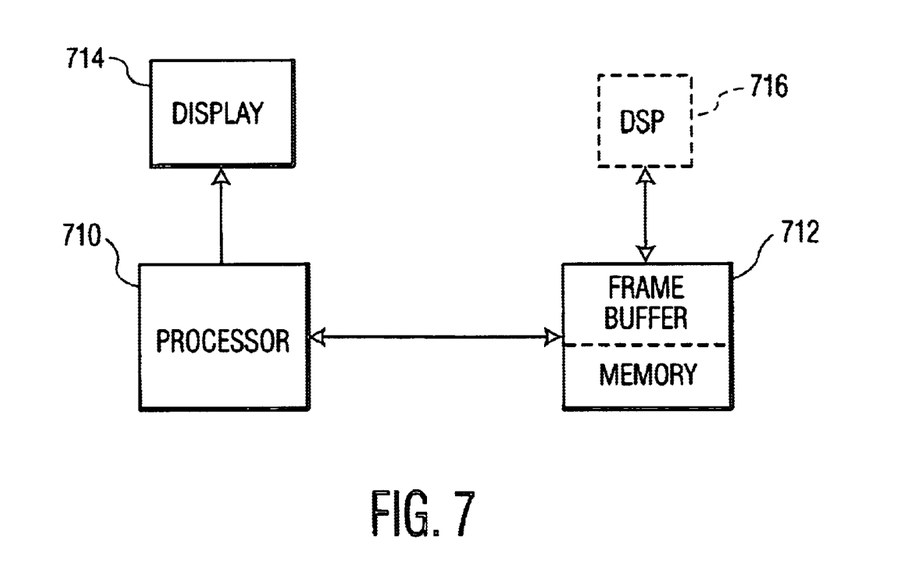
FIG. 7 is a block diagram showing exemplary computer systems that may use the subject invention.

FIG. 7 is a block diagram of a general purpose computer. The subject invention has been described in terms of a computer program designed to be executed on a general purpose processor 710 which is coupled to a frame buffer 712 and a color matrix display device 714. The computer program may be embodied in a carrier such as a computer disk drive, either magnetic or optical, a removable diskette or a modulated signal, in which case, the carrier may be a radio frequency (RF) carrier wave.

It is contemplated that the invention may also be implemented in a special-purpose digital signal processor (DSP) 716 (shown in phantom) that is coupled to the frame buffer used by a color matrix display. In this embodiment, the DSP accesses the image data as it is being displayed in order to perform the simulated rendering operation.

While this invention has been described with reference to specific embodiments, it is not limited thereto. Accordingly, the appended claims should be construed to encompass not only those forms and embodiments of the invention specifically described above, but to such other forms and embodiments as may be devised by those skilled in the art without departing from its scope as defined by the appended claims.

What is claimed:

1. A digital signal processing method for processing data representing rendered black and white text and graphics, comprising the steps of:
   a) receiving digital values representing respective sub-pixel color intensity matrices each having M×N pixels, where M and N are integers;
   b) interleaving of the Intensity matrix data horizontally to form a M×3N gray-scale image;
   c) detecting black and white text and graphics (TG) regions the gray-scale image;
   d) selectively performing a morphological thinning operation on detected black and white TG regions in the image to selectively replace target black or white pixels with white or black pixels, respectively, responsive to values of the pixel values surrounding the target pixel values
   f) filtering the processed TG regions to minimize color fringing while maximizing image resolution;
   g) restoring the sub-pixel color signal intensity matrix by horizontally de-interleaving the gray-scale image; and
   f) displaying the restored sub-pixel color intensity matrix.

2. A method according to claim 1, wherein the step of selectively performing the morphological thinning operation on the detected black and white TG regions includes the steps of:

generating a binary mask having a plurality of bit positions corresponding to each pixel in the image, each bit having a value such that bits corresponding to black pixels and white pixels have a first value while bits corresponding to pixels that are not black or white have a second value, opposite to the first value;

forming a logical AND of the pixel positions of the image and the respective bit positions of the binary mask to form an image in which only the black and white pixel values are non-zero; and filtering the black and white image with a morphological filter.

3. A method according to claim 2, wherein the step of filtering the black and white image with the morphological filter comprises the steps of:

defining a block of n×n pixels, where n is an integer less than M and N, and translating each of the pixel positions in the n×n block into respective single-bit binary values;

generating a multi-bit binary value from the n×n single-bit binary values;

applying the multi-bit binary value to a look-up table to produce a single-bit output value for a central pixel in the n×n block of pixels as defined by the morphological thinning operation; and replacing the central pixel in the n×n block of pixels by a binary value corresponding to the single-bit value provided by the look-up table.

4. A method according to claim 1, wherein in the step of filtering the processed TG regions includes the step of convolving the TG regions with a Kaiser windowed sinc function.

5. A method according to claim 4, wherein in the Kaiser windowed sinc function has a bandwidth of about 0.3 (with 1 being a normalized sampling frequency).

6. A method according to claim 1, wherein in the step of performing the morphological thinning operation on previously detected black and white TG regions includes the steps of;

creating a n×n fate table, wherein the $n^2$ neighboring sub-pixels each has a value of 0 or 1, depending on whether the sub-pixel is black or white, respectively;

coding the $n^2$ binary value to produce a single integer number between 0 and $2^{n \times n}-1$;

using integer number to address into a table with $2^{n \times n}$ entries that provides either a 0 or 1 to replace the center pixel of the n×n pixel block.

7. A method according to claim 1, wherein the TG are white on a black background and the step of performing the morphological thinning operation on previously detected black and white TG includes the steps of:

reversing the image by replacing every white pixel with a black pixel and every black pixel with a white pixel;

performing the morphological thinning operation on the reversed image; and reversing the image by replacing every white pixel with a black pixel and every black pixel with a white pixel.

8. A digital signal processing system for processing data representing rendered black and white text and graphics, comprising:

means for receiving digital values representing respective sub-pixel color intensity matrices each having M×N pixels, where N and N are Integers;

means for interleaving of the intensity matrix data horizontally to form a M×3N gray-scale image;

means for detecting black and white text and graphics (TG) regions the gray-scale image;

means for selectively performing a morphological thinning operation an detected black and white TG regions in the image to selectively replace target black or white pixels with white or black pixels, respectively, responsive to values of the pixel values surrounding the target pixel values;

means for filtering the processed TG regions to minimize color fringing while maximizing image resolution;

means for restoring the sub-pixel color intensity matrix by horizontally de-interleaving the gray-scale image; and means for displaying the restored sub-pixel color intensity matrix.

9. Apparatus according to claim 8 wherein the means for filtering includes a filter having a frequency response characteristic which approximates a Kaiser windowed sinc function.

10. Apparatus according to claim 9 wherein in the Kaiser windowed sinc function has a bandwidth of about 0.3 (with 1 being a normalized sampling frequency).

11. Apparatus according to claim 8, wherein in the means for performing the morphological thinning operation includes:

means for creating a n×n fate table, wherein the $n^2$ neighboring sub-pixels each has a value of 0 or 1, depending on whether the sub-pixel Is black or white, respectively;

means for coding the $n^2$ binary values to produce a single integer number between 0 and $2^{n \times n}-1$;

a look-up table having $2^{n \times n}$ entries, each corresponding to a respective possible value of the coded $n^2$ binary values, wherein the coded $n^2$ binary value provided by the means for coding is applied to the look-up table to produce a single-bit binary output value to replace a center pixel of the n×n pixel block.

12. Apparatus according to claim 8, wherein the TG are white on a black background and the means for performing the morphological thinning operation on previously detected black and white TG includes:

means for reversing the image by replacing every white pixel with a black pixel and every black pixel with a white pixel;

means for performing the morphological thinning operation on the reversed image; and means for reversing the Image by replacing every white pixel with a black pixel and every black pixel with a white pixel.

13. A carrier including a program which controls a computer to process data representing rendered black and white text and graphics, the program causing the computer to perform the steps of:

a) receiving digital values representing respective sub-pixel color Intensity matrices each having M×N pixels, where M and N are integers;

b) interleaving of the intensity matrix data horizontally to form a M×3N gray-scale image;

c) detecting black and white text and graphics (TG) regions the gray-scale image;

d) selectively performing a morphological thinning operation on detected black and white TG regions in the image to selectively replace target black or white pixels with white or black pixels, respectively, responsive to values of the pixel values surrounding the target pixel values f) filtering the processed TG regions to minimize color fringing while maximizing image resolution;

g) restoring the sub-pixel color intensity matrix by horizontally de-interleaving the gray-scale image; and f) displaying the restored sub-pixel color intensity matrix.

14. A carrier according to claim 13, the program step which causes the computer to selectively perform the morphological thinning operation on the detected black and white TG regions causes the computer to perform the steps of:

generating a binary mask having a plurality of bit positions corresponding to each pixel in the image, each bit having a value such that bits corresponding to black pixels and white pixels have a first value while bits corresponding to pixels that are not black or white have a second value, opposite to the first value;

forming a logical AND of the pixel positions of the image and the respective bit positions of the binary mask to form an image in which only the black and white pixel values are non-zero; and filtering the black and white image with a morphological filter.

15. A carrier according to claim 14, wherein the program step which causes the computer to filter the black and white image with the morphological filter causes the computer to perform the steps of:

defining a block of n×n pixels, where n is an integer less than M and N, and translating each of the pixel positions in the n×n block into respective single-bit binary values, generating a multi-bit binary value from the n×n single-bit binary values;

applying the multi-bit binary value to a look-up table to produce a single-bit output value for a central pixel in the n×n block of pixels as defined by the morphological thinning operation; and replacing the central pixel in the n×n block of pixels by a binary value corresponding to the single-bit value provided by the look-up table.

\* \* \* \* \*